(12) United States Patent
Yoneda et al.

(10) Patent No.: US 8,916,678 B2
(45) Date of Patent: *Dec. 23, 2014

(54) POLYALKYLENE GLYCOL MONOMER, POLYALKYLENE GLYCOL POLYMER CONTAINING THE SAME, AND APPLICATION THEREOF

(75) Inventors: Atsuro Yoneda, Toyonaka (JP); Akiko Hemmi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 513 days.

This patent is subject to a terminal disclaimer.

(21) Appl. No.: 12/088,629

(22) PCT Filed: Sep. 26, 2006

(86) PCT No.: PCT/JP2006/319654
§ 371 (c)(1),
(2), (4) Date: Mar. 28, 2008

(87) PCT Pub. No.: WO2007/037469
PCT Pub. Date: Apr. 5, 2007

(65) Prior Publication Data
US 2008/0221293 A1 Sep. 11, 2008

(30) Foreign Application Priority Data
Sep. 29, 2005 (JP) ................. 2005-284531

(51) Int. Cl.
*C08G 65/04* (2006.01)
*C08L 51/08* (2006.01)
*C11D 3/37* (2006.01)
*B01F 17/00* (2006.01)
*C08F 290/06* (2006.01)
*C04B 24/26* (2006.01)
*C11D 3/00* (2006.01)
*C04B 24/16* (2006.01)
*C08F 283/06* (2006.01)
*C04B 24/32* (2006.01)
*C08G 65/26* (2006.01)

(52) U.S. Cl.
CPC ............ *C08F 283/065* (2013.01); *C08L 51/08* (2013.01); *C11D 3/3746* (2013.01); *B01F 17/0028* (2013.01); *C08F 290/06* (2013.01); *C04B 24/2605* (2013.01); *C11D 3/0036* (2013.01); *C04B 24/161* (2013.01); *C08F 290/062* (2013.01); *C04B 24/32* (2013.01); *C08G 65/2609* (2013.01)
USPC ........................................ 528/421

(58) Field of Classification Search
None
See application file for complete search history.

(56) References Cited

U.S. PATENT DOCUMENTS

| 4,338,239 | A | * | 7/1982 | Dammann ..................... 524/549 |
| 4,684,709 | A | * | 8/1987 | Ona et al. .......................... 528/15 |
| 6,451,952 | B2 | | 9/2002 | Yamaguchi et al. |
| 6,765,082 | B2 | | 7/2004 | Sunder et al. |
| 6,822,068 | B2 | | 11/2004 | Sunder et al. |
| 6,919,388 | B2 | | 7/2005 | Nishikawa et al. |
| 2005/0197485 | A1 | | 9/2005 | Saeki et al. |
| 2005/0261457 | A1 | | 11/2005 | Falk et al. |

FOREIGN PATENT DOCUMENTS

| CN | 1671475 A | 9/2005 |
| EP | 1158009 | 11/2001 |
| EP | 1568726 | 8/2005 |
| JP | 3293294 | 6/1995 |
| JP | 08-193128 | 7/1996 |
| JP | 3615683 | 9/2001 |
| JP | 2002-100404 | 4/2002 |
| JP | 2002-121057 | 4/2002 |
| JP | 2002-138115 | 5/2002 |
| JP | 2002-533495 | 10/2002 |
| JP | 2005-239964 | 9/2005 |
| WO | WO-00/37532 | 6/2000 |
| WO | WO-2004-026468 | 4/2004 |

OTHER PUBLICATIONS

Xiao-Guang Sun et al., Macromolecules 2006, 39, 362-372, published on Web Nov. 23, 2005.*
CAS Database citation 1989:40460, DE 3723350 [retrieved Nov. 4, 2010] from STN; Columbus, OH, USA.*
CAS Database citation 1991:585452, JP 03077677[retrieved Nov. 4, 2010] from STN; Columbus, OH, USA.*
Database CAPLUS Chemical Abstracts Service, Columbus, Ohio, US; Database Accession No. 1992:73028, Abstract of Yasukochi et al, JP 01297411.*
Database CAPLUS Chemical Abstracts Service, Columbus, Ohio, US; Database Accession No. 2003:734809, Abstract of Ishikawa et al., JP 2003261605.*
Database CAPLUS Chemical Abstracts Service, Columbus, Ohio, US; Database Accession No. 1996:537000, Abstract of Ando et al., JP 08142012.*
Machine Translation of JP 2003261605.*
Supplementary European Search Report for Counterpart Application No.: 06798495.5 Dated Feb. 15, 2010.
Louis Ho Tan Tai, "Formulating Detergents and Personal Care Products", AOCS Press, pp. 53 to 54 (2000).
Zhang et al., "Synthesis of the copolymer of tribromophenyl glycidyl ether, allyl glycidyl, epoxypropane and oxirane," Science & Technology in Chemical Industry, vol. 11, No. 4, pp. 7-10, 2003.

* cited by examiner

*Primary Examiner* — Karl J Puttlitz
(74) *Attorney, Agent, or Firm* — Novak Druce Connolly Bove + Quigg LLP

(57) ABSTRACT

To provide: a monomer having a polyalkylene glycol chain preferably used in various industrial applications such as detergent builder compositions for clothes and bodies, water-treatment agents, and pigment dispersants; and a polyalkylene glycol polymer using such a monomer as a raw material. A polyalkylene glycol monomer having a polymerizable double bond and a polyalkylene glycol chain, wherein the polyalkylene glycol monomer has a hydrophobic part in the polyalkylene glycol chain and/or at a terminal of the chain, and the polymerizable double bond is derived from allyl glycidyl ether, and a polyalkylene glycol monomer having a monomer unit derived from the above-mentioned polyalkylene glycol monomer, wherein the polyalkylene glycol polymer is a polyalkylene glycol polymer having a carboxylic acid group and/or a sulfonic acid group.

6 Claims, No Drawings

_US 8,916,678 B2_

POLYALKYLENE GLYCOL MONOMER, POLYALKYLENE GLYCOL POLYMER CONTAINING THE SAME, AND APPLICATION THEREOF

JOINT RESEARCH AGREEMENT

Inventions in this application were made as a result of activities undertaken within the of a joint research agreement, within the meaning of 35 U.S.C. 100(h) and §1.9(e) between Nippon Shokubai Co., Ltd. and The Proctor and Gamble Company. The joint research agreement was in effect on or before the date inventions claimed in this application were made.

RELATED APPLICATIONS

This application is a national stage application (under 35 U.S.C. §371) of PCT/JP2006/319654 filed Sep. 26, 2006, which claims benefit of Japanese application 2005-284531 filed Sep. 29, 2005, disclosure of which is incorporated herein by reference.

TECHNICAL FIELD

The present invention relates to a polyalkylene glycol monomer, a water-soluble polymer containing such a monomer, and an application thereof. More specifically, the present invention relates to a polyalkylene glycol monomer preferably used as various industrial raw materials and a polyalkylene glycol polymer which can be preferably used in various applications such as detergent compositions, fiber-treatment agents, water-treatment agents, and pigment dispersants.

BACKGROUND ART

Polyalkylene glycol monomers are one of useful industrial raw materials which have been utilized in various industrial fields. Such polyalkylene glycol monomers are polymerized with carboxylic acid (salt) monomers to produce polymers which can be used in various applications. Polyalkylene glycol polymers prepared by using such polyalkylene glycol monomers as a raw material have been widely used in various applications as cement additives or thickeners having high basic performances, for example.

With respect to conventional polyalkylene glycol monomers, Japanese Patent No. 3293294 (pages 1 and 2) discloses an additive for cement using terminal alkyl ether of a polyalkylene glycol monomer. Such a cement additive contains, as a main component, a reaction product obtained by allowing a polymer (A) containing, as essential components, (i) maleic anhydride and (ii) a polyoxyalkylene derivative represented by the formula: $R^1O(A^1O)mR^2$, $R^1$ being a C2 to C5 alkenyl group (an alkenyl group containing 2 to 5 carbon atoms); $A^1O$ being a C2 to C4 oxyalkylene group including at least 50 mol % oxyethylene group; $R^2$ being a C1 to C18 hydrocarbon group; and m being an integer of 1 to 200], to react with (B) a polyoxyalkylene derivative represented by the formula: $R^3O(C_2H_4O)x(A^2O)y(C_2H_4O)zH$, in the formula, $R^3$ being a C1 to C22 hydrocarbon group or acyl group; $A^2O$ being an oxyalkylene group containing 3 or 4 carbon atoms; x being 0 or an integer of 1 to 20; y being an integer of 10 to 100; and z being 0 or an integer of 1 to 20; a relationship of $y \geq x+z \geq 1$ being satisfied; and $(C_2H_4O)$ and $(A^2O)$ chains are a block adduct.

With respect to applications of cement additives, Japanese Kokai Publication No. 2002-121057 (pages 2, 21 to 28) discloses a cement admixture essentially containing a compound (A) represented by the formula (1): $R^1$—O—$(R^2O)$n-X—$R^3$ (in the formula, X representing —CO— or —$CH_2CH_2NHCO$—); $R^1$ representing a hydrocarbon group containing 1 to 30 carbon atoms; $R^2O$ being the same or different and representing an oxyalkylene group containing 2 to 18 carbon atoms; n representing an average molar number of oxyalkylene group added and being an integer of 1 to 300; and $R^3$ representing at least one carboxyl group or sulfonyl group or group containing a salt thereof and a polyalkylene glycol monomer having an acid hydride-modified terminal.

Further, with respect to thickener applications, Japanese Patent No. 3615683 (pages 1 and 2) discloses a polymer having a structure unit derived from a polyalkylene glycol monomer having an alkyl ester or an alkyl amide at the terminal.

However, such a polymer has room for improvement in order to be preferably used in various applications by further studying the structure of the polyalkylene glycol monomer. Applications of such a polyalkylene glycol monomer or a polymer thereof have room for development by further studying the use in applications other than the cement additive and the thickener.

Performances of suppressing and preventing precipitation of surfactants or redeposition of soils which causes reduction in detergency, as well as performances of improving detergency of cleaning agents have been desired as performances required for cleaning agent builders. The precipitation of surfactants is generated if a linear alkylbenzene sulfonic acid (salt) (LAS) such as dodecylbenzenesulfonic acid, which is an anionic surfactant, is bonded to calcium ion or magnesium ion existing in water. Therefore, the problem of precipitation of surfactants is remarkable in the cases where cleaning is performed with water having a relatively high hardness (for example, referring to Louise Ho Tan Tai, "Formulating Detergents and Personal Care Products", AOCS Press, pp. 53 to 54 (2000)).

However, it has been desired for the polymers to have more excellent performance of suppressing precipitation of surfactants (hereinafter, also referred to as simply "precipitation suppressing ability") and/or performance of suppressing redeposition of soils (particularly, hydrophobic soils such as clay) (hereinafter, also referred to as simply "anti-soil redeposition ability").

SUMMARY OF THE INVENTION

The present invention has been made in view of the above-mentioned state of the art. The present invention has an object to provide: a monomer having a polyalkylene glycol chain, the monomer being preferably used in various industrial applications such as detergent builder compositions for clothes and bodies, water-treatment agents, and pigment dispersants; and a polyalkylene glycol polymer prepared by such a monomer as a raw material.

The present inventors have made various investigations about monomers having a polyalkylene glycol chain. They have found that if such a monomer further contains a hydrophobic part, a polyalkylene glycol polymer prepared by such a monomer has a hydrophobic part and therefore adsorbs hydrophobic substances because of hydrophobic interaction, and exhibits properties such as excellent dispersibility of hydrophobic particles, anti-soil redeposition ability of hydrophobic soils, and detergency, in addition to dispersibility attributed to the polyalkylene glycol chain. The present inventors have also found that a cement additive, a cement admixture, a cement composition, and the like, containing such a polyalkylene glycol polymer can exhibit excellent surface activity because of the structure of the polyalkylene glycol polymer, and therefore preferably used. Thereby, the above-mentioned problems have been admirably solved. The present inventors have also found that such a polymer can be preferably used in various applications such as cleaning agent compositions, fiber-treatment agents, water-treatment agents, various dispersants for pigments, and the like. Thereby, the present invention has been completed.

In conventional polyalkylene glycol monomers, a polyalkylene glycol monomer in which an epoxy compound is introduced into the terminal has not been found yet. Also, in a detergent builder application, a polyalkylene glycol polymer containing such a polyalkylene glycol monomer having a modified terminal has not been found yet.

The present inventors have found that if polyalkylene glycol monomers such as an isoprenol-EO adduct are the following monomers: monomers in which an epoxy compound such as phenyl glycidyl ether is introduced into the polyalkylene glycol chain or a terminal of the chain; monomers in which the polyalkylene glycol chain terminal is modified with an acid anhydride such as phthalic anhydride; and monomers in which a polymerizable double bond is added to a polyalkylene glycol having a terminal hydrophobic group by allyl glycidyl ether and the like, such monomers, among the above-mentioned monomers, have an introduced hydrophobic group and a polyalkylene glycol chain and therefore can be used in various applications. They have found that particularly if these monomers are used as a raw material for copolymerization with a carboxylic acid (salt) monomer and/or a sulfonic acid (salt) monomer, the obtained polymers have excellent basic performances and can be used in various applications, and also exhibit detergency to hydrophobic soils if used in a detergent builder application. They have also found that the polymers can exhibit sufficiently excellent performances in both of precipitation suppressing ability and anti-soil redeposition ability if used as a cleaning agent builder.

That is, the present invention is a polyalkylene glycol monomer having a polymerizable double bond and a polyalkylene glycol chain, wherein the polyalkylene glycol monomer has a hydrophobic part in the polyalkylene glycol chain and/or at a terminal of the chain, and the polymerizable double bond is derived from allyl glycidyl ether.

The present invention is also a polyalkylene glycol monomer having a polymerizable double bond and a polyalkylene glycol chain, wherein the polyalkylene glycol monomer has a hydrophobic part in the polyalkylene glycol chain and/or at a terminal of the chain; the polymerizable double bond is derived from isoprenol, allyl alcohol, or methallyl alcohol; and the hydrophobic part is derived from glycidyl ether containing 1 to 20 carbon atoms.

DETAILED DESCRIPTION OF THE INVENTION

The present invention is described in more detail below.

The polyalkylene glycol monomer of the present invention has a polymerizable double bond and a polyalkylene glycol chain having a hydrophobic part in the chain and/or at a terminal of the chain, and includes the following monomers (1) and (2). (1) The polyalkylene glycol monomer, wherein the polymerizable double bond is derived from allyl glycidyl ether (hereinafter, also referred to as polyalkylene glycol monomer (a); and (2) the polyalkylene glycol monomer, wherein the polymerizable double bond is derived from isoprenol, allyl alcohol, or methallyl alcohol, and the hydrophobic part is derived from glycidyl ether containing 1 to 20 carbon atoms (hereinafter, also referred to as polyalkylene glycol monomer (b). The term "polyalkylene glycol monomer" means both of the polyalkylene glycol monomer (a) and the polyalkylene glycol monomer (b).

The above-mentioned polyalkylene glycol monomer (a) has a polymerizable double bond derived from allyl glycidyl ether. The monomer (a) can be polymerized with another monomer because of the presence of such a polymerizable double bond, and therefore can be preferably used as various industrial raw materials, and the like. The monomer (a) has high stability to change in pH or temperature because the allyl glycidyl ether is used. Therefore, the monomer (a) is not decomposed at the monomer synthesis or polymerization under severe conditions.

The number and the position of above-mentioned polymerizable double bond are not especially limited as long as the polymerizable double bond is contained in the polyalkylene glycol monomer (a). It is preferable that one polymerizable double bond is positioned at the terminal in one molecule of the polyalkylene glycol monomer (a).

In the above-mentioned polyalkylene glycol monomer (a), the hydrophobic part is not especially limited as long as it contains a group showing hydrophobicity (hereinafter, referred to as hydrophobic group).

One or two or more species of hydrocarbon groups containing 1 to 20 carbon atoms, or groups containing a carboxyl group an the like is/are preferred as the above-mentioned hydrophobic group.

Specific examples of the above-mentioned hydrocarbon group containing 1 to 20 carbon atoms include alkyl groups such as butyl group, 2-ethylhexyl group, octyl group, nonyl group, dodecyl group, octadecyl group; aryl groups such as phenyl group, naphthyl group, and anthryl group; alkylaryl groups such as nonylphenyl group and dodecyl phenyl group; and polycyclic alkyl groups such as cyclooctyl group, cholestanyl group, lanostanyl group. One or two or more species of them may be used. That is, the hydrocarbon group containing 1 to 20 carbon atoms is preferably an alkyl group, an aryl group, an alkylaryl group or a polycyclic alkyl group, each containing 1 to 20 carbon atoms.

Examples of the above-mentioned groups containing a carboxyl group include phthalic acid, trimellitic acid, tetrahydrophthalic acid, anhydrides thereof and salts thereof.

Preferred examples of the salts thereof include alkali metal salts, alkaline earth metal salts, ammonium salts, and organic ammonium salts. Lithium salt, sodium salt, potassium salt, and the like are preferred as the above-mentioned alkali metal salts. Alkaline earth metals such as calcium and magnesium are preferred as the alkaline earth metal salts. Examples of organic amine groups constituting the organic ammonium salts include alkanolamine groups such as ethanolamine group, diethanolamine group, and triethanolamine group, and triethylamine groups.

The above-mentioned hydrophobic part has the above-mentioned hydrophobic group, and preferably has a group derived from an epoxy group in addition to the hydrophobic group. If the hydrophobic part has a group derived from an epoxy group, the hydrophobic group can be easily introduced in the polyalkylene glycol chain and/or at a terminal of the chain at the synthesis of the polyalkylene glycol monomer (a).

The above-mentioned group derived from an epoxy group is preferably an epoxy group containing 2 to 5 carbon atoms, and preferably a glycidyl ether group, a glycidyl ester group, or the like.

Preferred examples of compounds having the above-mentioned epoxy group and the above-mentioned hydrophobic group include glycidyl ethers, glycidyl esters, alkylene oxides, each containing 3 to 25 carbon atoms.

Preferred examples of the above-mentioned glycidyl ethers containing 3 to 25 carbon atoms include phenyl glycidyl ether, n-butyl glycidyl ether, 2-ethyl hexyl glycidyl ether, sec-butyl phenol glycidyl ether, and 2-methyl octyl glycidyl ether.

Phenyl glycidyl ether, n-butyl glycidyl ether, and 2-ethyl hexyl glycidyl ether are more preferable and phenyl glycidyl ether and n-butyl glycidyl ether are more preferable as the above-mentioned hydrophobic part.

The number of the above-mentioned hydrophobic part is preferably 1 to 100 in one molecule of the polyalkylene glycol monomer. If the number is too large, the polymerizability in the aqueous polymerization may be remarkably reduced. The number of the hydrophobic part is more preferably 1 to 50 and still more preferably 1 to 20.

In the above-mentioned polyalkylene glycol chain, it is preferable that alkylene oxides containing 2 to 20 carbon atoms are the same or different, and 1 to 200 of such alkylene oxides are repeated.

One or two or more species of ethylene oxide, propylene oxide, and butylene oxide is/are preferable as the above-mentioned alkylene oxide containing 2 to 20 carbon atoms. Among them, ethylene oxide and propylene oxide are preferable and ethylene oxide is more preferable. Use of ethylene oxide has advantages of high polymerization reactivity and easy extension of the polyalkylene glycol chain length. If ethylene oxide is used, the proportion of the ethylene oxide based on the polyalkylene glycol chain is 50 to 100 mol %, and more preferably 70 to 100 mol %, and still more preferably 90 to 100 mol %.

If the polyalkylene glycol chain contains the above-mentioned two or more species of alkylene oxides, these alkylene oxides may be added randomly, alternatively, or in block.

The repeating number of the above-mentioned alkylene oxide is preferably 1 to 200. If the repeating number thereof is 200 or more, the polymerizability may be remarkably reduced. The repeating number thereof is more preferably 1 to 100, and still more preferably 1 to 50.

The above-mentioned hydrophobic part is positioned in the polyalkylene glycol chain and/or at a terminal of the chain. The position may be appropriately determined depending on the hydrophobic part to be used. It is preferable that at least one hydrophobic part is positioned at the terminal in order to easily exhibit the functions. Therefore, the polyalkylene glycol monomer (a) preferably has an embodiment in which the polymerizable double bond is positioned at one terminal of the polyalkylene glycol chain, and the hydrophobic part is positioned at the other terminal.

If the above-mentioned hydrophobic part is positioned in the chain, the position is preferably distributed near the terminal.

The above-mentioned polyalkylene glycol monomer (a) is preferably a monomer in which a polymerizable double bond is added by allyl glycidyl ether to a polyalkylene glycol having a hydrophobic part at a terminal represented by the following formula (2):

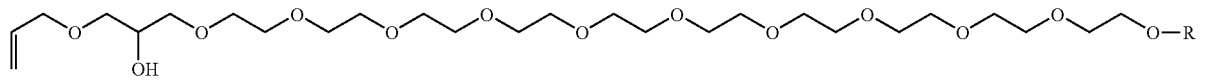

(2)

in the formula, R representing a hydrophobic part.

The above-mentioned polyalkylene glycol monomer (b) has a polymerizable double bond derived from isoprenol, allyl alcohol, or methallyl alcohol. The monomer (b) can be polymerized with another monomer and therefore can be preferably used as various industrial raw materials if containing such a polymerizable double bond.

The number and the position of the above-mentioned polymerizable double bond are not especially limited as long as the polymerizable double bond is contained in the polyalkylene glycol monomer (b). It is preferable that one polymerizable double bond is positioned at the terminal in one molecule of the polyalkylene glycol monomer (b).

The glycidyl ether containing 3 to 25 carbon atoms mentioned above in the hydrophobic part of the polyalkylene glycol monomer (a) are preferred as the glycidyl ether containing 3 to 25 carbon atoms in the above-mentioned polyalkylene glycol monomer (b). More preferred are phenyl glycidyl ether, n-butyl glycidyl ether, and 2-ethylhexyl glycidyl ether, and still more preferred are phenyl glycidyl ether and n-butyl glycidyl ether.

In the above-mentioned polyalkylene glycol monomer (b), the number of the hydrophobic part, the polyalkylene glycol chain, the position of the hydrophobic part and preferable changes thereof are the same as those in the polyalkylene glycol monomer (a), respectively.

Among them, the above-mentioned polyalkylene glycol monomer (b) is most preferably a monomer in which an epoxy group of phenyl glycidyl ether is introduced into the polyalkylene glycol chain and/or the terminal of the chain represented by the following formula (3) and the following formula (4):

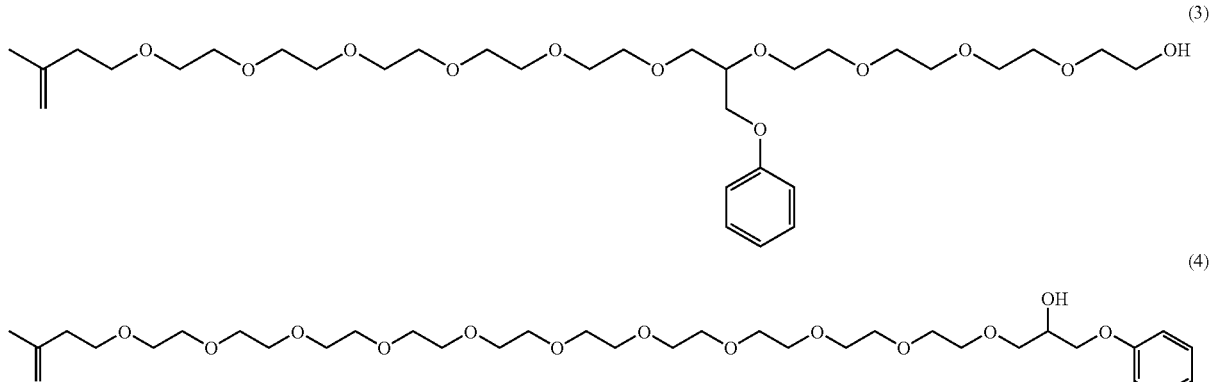

A production method of the above-mentioned polyalkylene glycol monomers (a) and (b) is not especially limited. If one hydrophobic part is positioned at the terminal of the chain, preferred is a method (1) of reacting a compound prepared by adding a polyalkylene glycol chain to a compound having a polymerizable double bond with a compound constituting a hydrophobic part in the coexistence of an alkali catalyst or an acid catalyst and in the absence of a solvent. It is more preferable that such a method is performed under pressure conditions. If at least one hydrophobic part is positioned in the chain, preferred is a method (2) of adding a polyalkylene glycol chain to a compound having a polymerizable double bond and appropriately adding a compound constituting a hydrophobic part thereto in the coexistence of an alkali catalyst or an acid catalyst and in the absence of a solvent, and further if necessary, adding a compound constituting a hydrophobic part to the polyalkylene glycol chain. It is more preferable that such a method is performed under pressure conditions.

In the above-mentioned methods, the reaction of adding a polyalkylene glycol chain to a compound with a polymerizable double bond can be performed by a conventional method. The monomers can be produced by adding a predetermined amount of alkylene oxides to a compound with a polymerizable double bond.

The hydrophobic part is introduced into the above-mentioned polyalkylene glycol monomer by the above-mentioned method, generally. Therefore, the polyalkylene glycol monomer having a hydrophobic part of the present invention is a polyalkylene glycol monomer into which the hydrophobic part is introduced. Polyalkylene glycol monomers into which the hydrophobic part is not introduced may be mixed. The polyalkylene glycol monomer into which the hydrophobic part is introduced is preferably a main component and preferably 50% by weight or more, and more preferably 70% by weight, and still more preferably 80% by weight, for example.

The present invention is also a polyalkylene glycol polymer having a monomer unit derived from the polyalkylene glycol monomer, wherein the polyalkylene glycol polymer is a polyalkylene glycol polymer having a carboxylic acid group and/or a sulfonic acid group.

The above-mentioned polyalkylene glycol polymer preferably has a carboxylic acid (salt) group and/or a sulfonic acid (salt) group. That is, as the above-mentioned polyalkylene glycol polymer, one or two or more species of carboxylic acid (salt) polymers having a monomer unit derived from the above-mentioned polyalkylene glycol monomer and sulfonic acid (salt) polymers having a monomer unit derived from the above-mentioned polyalkylene glycol monomer are preferred. Thus, the preferable embodiments of the present invention include a polymer containing at least one species of carboxylic acid (salt) polymers having a monomer unit derived from the above-mentioned polyalkylene glycol monomer and sulfonic acid (salt) polymers having a monomer unit derived from the above-mentioned polyalkylene glycol monomer.

The above-mentioned polyalkylene glycol polymer is a polymer containing at least one species of carboxylic acid (salt) polymers having a monomer unit derived from the above-mentioned polyalkylene glycol monomer (a) and sulfonic acid (salt) polymers having a monomer unit derived from the above-mentioned polyalkylene glycol monomer (a) (hereinafter, also referred to as polycarboxylic acid (salt) polymer (1)) and is also a polymer containing at least one species of carboxylic acid (salt) polymers having a monomer unit derived from the above-mentioned polyalkylene glycol monomer (b) and sulfonic acid (salt) polymers having a monomer unit derived from the above-mentioned polyalkylene glycol monomer (b) (hereinafter, also referred to as polyalkylene glycol polymer (2)). Hereinafter, the term "polyalkylene glycol polymer" means both of the polyalkylene glycol polymer (1) and the polyalkylene glycol polymer (2).

The above-mentioned polyalkylene glycol polymer has a monomer unit derived from at least one of the above-mentioned polyalkylene glycol monomers (a) and (b), and therefore has a hydrophobic part and a polyalkylene glycol chain. Therefore, such a polymer exhibits various excellent performances, and is excellent in dispersibility of hydrophobic particles, anti-soil redeposition ability to hydrophobic soils, detergency, and clay dispersibility, for example.

It is preferable that the polyalkylene glycol polymer has an anti-soil redeposition ability of 75 or more. The polymer having an anti-soil reposition ability within such a range is enough to be used in various applications such as detergent compositions, fiber-treatment agents, water-treatment agents, pigment dispersants, because the polymer can sufficiently whiten white clothes as evaluation objects. The polymer more preferably has an anti-soil redeposition ability of 78 or more.

It is preferable that the above-mentioned polyalkylene glycol polymer has a clay dispersibility of 0.40 or more. If the clay dispersibility is within such a range, the polyalkylene glycol polymer is enough to be used in various applications such as water-treatment agent and pigment dispersant. If the clay dispersibility is less than 0.40, the fundamental capabilities are not enough, possibly leading to reduction in performances in various applications. The polymer more preferably has a clay dispersibility of 0.44 or more. The following methods can be employed as measurement methods of the above-mentioned anti-soil redeposition ability and the clay dispersibility, respectively.

The above-mentioned polyalkylene glycol polymer is not especially limited as long as it has at least one species of monomer units derived from the carboxylic acid (salt) monomer and monomer units derived from the sulfonic acid (salt) monomer (hereinafter, the "at least one species of monomer of monomer units derived from the carboxylic acid (salt) monomer and monomer units derived from the sulfonic acid (salt) monomer" is also referred to as "carboxylic acid and/or sulfonic acid monomer") and also has a monomer unit derived from at least one of the above-mentioned polyalkylene glycol monomers (a) and (b). The polymer may have a monomer unit derived from another monomer (hereinafter, referred to as monomer (A)).

With respect to the proportion of the carboxylic acid and/or sulfonic acid monomer, the polyalkylene glycol monomer, and the monomer (A) in the above-mentioned polyalkylene glycol polymer, it is preferable that, relative to 100% by weight of the polyalkylene glycol polymer, the proportion of the carboxylic acid and/or sulfonic acid monomer is 10 to 99% by weight; the proportion of the polyalkylene glycol monomer is 10 to 90% by weight; and the proportion of the monomer (A) is 0 to 30% by weight.

The above-mentioned polyalkylene glycol monomer means the total proportion of the polyalkylene glycol monomer (a) and/or (b).

Preferred examples of the above-mentioned carboxylic acid (salt) monomer include (meth)acrylic acid monomers such as acrylic acid and methacrylic acid; monoethylenically unsaturated aliphatic monocarboxylic acids such as crotonic acid, α-hydroxy acrylate, and α-hydroxymethyl acrylate; monoethylenically unsaturated aliphatic dicarboxylic acids such as maleic acid, maleic anhydride, fumaric acid, and itaconic acid; acid anhydrides thereof, and salts thereof. The above-mentioned alkali metal salts, alkaline earth metal salts, ammonium salts, and organic ammonium salts are preferred if the carboxylic acid (salt) monomer is a salt. Among them, acrylic acid, methacrylic acid, maleic acid, maleic anhydride, and salts thereof are more preferred and acrylic acid, methacrylic acid, maleic anhydride, and salts thereof are still more preferable. That is, the preferable embodiments of the present invention include a (meth)acrylic acid polymer having a monomer unit derived from the above-mentioned polyalkylene glycol monomer.

Examples of the above-mentioned sulfonic acid (salt) monomer include sulfonic acid group-containing monoethylenically unsaturated compounds such as vinyl sulfonate, allyl sulfonate, methallyl sulfonate, 2-hydroxy-3-allyloxy propane sulfonic acid, 2-acrylamide-2-methylpropane sulfonic acid, and 2-methacryloyl oxyethyl sulfonic acid. Among them, 2-hydroxy-3-allyloxy propane sulfonic acid, 2-acrylamide-2-methylpropane sulfonic acid, and 2-methacryloyl oxyethyl sulfonic acid are more preferred, and 2-hydroxy-3-allyoxy propane sulfonic acid and 2-acrylamide-2-methylpropane sulfonic acid are still more preferred.

The above-mentioned monomer (A) is not especially limited as long as it can be copolymerizable with the carboxylic acid and/or sulfonic acid monomer and the polyalkylene glycol monomer. The monomer (A) is preferably an ethylenically unsaturated monomer because the carboxylic acid and/or sulfonic acid monomer and the polyalkylene glycol monomer are ethylenically unsaturated monomers. The "ethylenically unsaturated monomer" means compounds in which a hydrogen atom of ethylene ($CH_2=CH_2$) is substituted. If the monomer (A) is a salt form, the above-mentioned salts are also preferred.

Preferred examples of the above-mentioned ethylenically unsaturated monomer include unsaturated hydrocarbons having a hydroxyl group such as methacrylic acid 2-hydroxyethyl, glyceryl methacrylate, and 3-allyloxy-1,2-propanediol; and salts thereof if these compounds have a salt form. Carboxylic acid and/or sulfonic acid monomers belonging to ethylenically unsaturated monomers may be used as the ethylenically unsaturated monomer.

Examples of the above-mentioned monomer (A) include (meth)acrylic esters such as vinyl acetate, vinyl pyrrolidone, vinyl ethers, styrene, α-hydroxymethyl methyl acrylate, methyl(meth)acrylate, and ethyl(meth)acrylate.

The above-mentioned monomer (A) may be the above-mentioned polyalkylene glycol monomer not having a hydrophobic part which can be used as a raw material of the polyalkylene glycol monomer having a hydrophobic part. Specifically, compounds prepared by adding 1 to 200 mole, preferably 2 to 150 mole, still more preferably 3 to 120 mole, and most preferably 4 to 100 mole of an alkylene oxide containing 2 to 20 carbon atoms to 1 mole of an unsaturated alcohol such as isoprenol and ally alcohol are preferably used.

The neutralization degree of the above-mentioned polyalkylene glycol polymer is not especially limited and appropriately adjusted depending on intended use. The neutralization degree thereof is preferably 1 to 100%, and more preferably 20 to 99%, and still more preferably 50 to 98%.

The above-mentioned polyalkylene glycol polymer has a weight average molecular weight of 500 to 100000, and more preferably 1000 to 70000, and still more preferably 1500 to 50000. The polyalkylene glycol polymer having a weight average molecular weight within such a range can be excellent in various performances such as dispersibility and chelating ability.

"Measurement Method of Weight Average Molecular Weight (Mw)"

The above-mentioned weight average molecular weight (Mw) of the polyalkylene glycol polymer can be measured, for example, under the following conditions using gel permeation chromatography (product of Showa Denko K.K., tradename "Shodex-GPC SYSTEM-21").

(Measurement Condition of Weight-Average Molecular Weight)

Column: prepared by connecting "Asahipak GF-710 HQ" and "Asahipak GF-310 HQ" produced by Showa Denko K.K. in this order Eluent: 0.1N sodium acetate/acetonitrile=7/3 (vol ratio)

Flow rate: 0.5 mL/min

Temperature: 40° C.

Calibration curve: drawn using a polyethylene glycol standard sample (product of GL Sciences Inc.)

It is preferable that the polyalkylene glycol polymer is used in a detergent builder composition, a water-treatment agent, or a pigment dispersant. Further, the polyalkylene glycol polymer of the present invention can be preferably used in various applications such as cleaning agent compositions, fiber-treatment agents, dispersants, flocculants, scale inhibitors, chelating agents, bleaching assistants, pH adjustors, water-treatment agents, peroxide stabilizers, cement additives, cement admixtures, and cement compositions. Especially, in an application of cleaning agent compositions or fiber-treatment agents such as a detergent builder for clothing material or body, the hydrophobic part which the polyalkylene glycol polymer has interact with hydrophobic soils such as carbon black and soot, the hydrophobic groups absorb each other by hydrophobic interaction and the polyalkylene glycol chain part exhibits dispersion effect. Therefore, the polyalkylene glycol polymer of the present invention exhibits excellent carbon black dispersibility and anti-soil redeposition ability, and high detergency. The polyalkylene glycol polymer also exhibits excellent properties such as calcium ion binding capacity, clay (mud particles) dispersibility, capacity of capturing heavy metal ion such as iron ion and copper ion, prevention ability for iron ion deposition, and hydrogen peroxide stabilization ability. The polyalkylene glycol polymer exhibits excellent surface activity because of the structure of the polymer, and therefore can be preferably used in applications such as cement additives, cement admixtures, and cement compositions.

Further, the present invention is an additive comprising an anionic group-containing polymer, the additive being used in a detergent builder composition, a water-treatment agent, or a pigment dispersant, wherein the anionic group-containing polymer comprises, based on the total monomer units, 1 to 90% by weight of a monomer unit derived from a monomer represented by the following formula (1):

$$R^1O\text{-}(AO)n\text{-}R^2 \qquad (1)$$

(in the formula, $R^1$ representing an alkenyl group containing 2 to 5 carbon atoms; AO being the same or different and representing a group derived from an alkylene oxide containing 2 to 20 carbon atoms and/or a glycidyl ether containing 2 to 20 carbon atoms; $R^2$ representing an organic group containing 1 to 20 carbon atoms; and n representing an integer of 1 to 200).

The above-mentioned additive comprising the anionic group-containing polymer can be preferably used as a detergent builder composition, a water-treatment agent, or a pigment dispersant, and comprises the anionic group-containing polymer containing a monomer unit derived from an anionic group-containing monomer and the monomer unit represented by the above formula (1). That is, the preferable embodiments of the present invention include a detergent builder composition, a water-treatment agent, or a pigment dispersant, each comprising the anionic group-containing polymer, wherein the anionic group-containing polymer contains 1 to 90% by weight of the monomer unit derived from the monomer represented by the above formula (1), base on the total monomer units.

It is preferable that the anionic group-containing polymer shows an anti-soil redeposition ability of 75 or more when used in a detergent builder composition. The polymer more preferably shows an anti-soil redeposition ability of 78 or more. It is also preferable that the polymer shows a clay dispersibility of 0.40 or more. The polymer more preferably shows a clay dispersibility of 0.44 or more. The polymer can sufficiently exhibit functional effects as a detergent builder composition, a water-treatment agent, or a pigment dispersant if the anti-soil redeposition ability and/or the clay dispersibility satisfy/satisfies the above-mentioned range(s). Measurement methods mentioned below can be adopted as measurement methods of the above-mentioned anti-soil redeposition ability and clay dispersibility, respectively.

The above-mentioned anionic group-containing polymer is not especially limited as long as it has the monomer unit derived from the anionic group-containing monomer and the above-mentioned monomer unit. The polymer may have a monomer unit derived from another monomer (hereinafter, referred to as monomer (B)).

With respect to the proportion of the monomer units in the above-mentioned anionic group-containing polymer, it is preferable that 10 to 99% by weight of the monomer unit derived from the anionic group-containing monomer in 100% by weight of the monomer units constituting the anionic group-containing polymer. More preferably, 30 to 95% by weight of the monomer unit is contained, and still more preferably 50 to 90% by weight of the monomer unit is contained. It is preferable that 1 to 90% by weight of the monomer unit derived from the monomer represented by the above formula (1) is contained. More preferably, 5 to 70% by weight of the monomer unit is contained, and still more preferably 10 to 50% by weight of the monomer unit is contained. It is preferable that 0 to 30% by weight of the monomer unit derived from the above-mentioned monomer (B) is contained. More preferably, 0 to 20% by weight of the monomer unit is contained, and still more preferably 0 to 10% by weight of the monomer unit is contained. If the proportion of each of the monomer units is out of the above-mentioned range, the performances as a detergent builder and the like may be remarkably reduced.

Preferred examples of the above-mentioned anionic group-containing monomer include carboxylic acid (salt) monomers, sulfonic acid (salt) monomers, phosphoric acid (salt) monomers, sulfuric acid (salt) monomers, and phosphoric acid (salt) monomers. One or two or more species of them may be used. Among them, carboxylic acid (salt) monomers and sulfonic acid (salt) monomers are preferred. As mentioned above, also preferred is a detergent builder composition, a water-treatment agent, or a pigment dispersant, each comprising the carboxylic acid (salt) polymer, wherein the carboxylic acid (salt) polymer comprises 1 to 90% by weight of the monomer unit derived from the monomer represented by the above formula (1) based on the total monomer units. Also preferred is a detergent builder composition, a water-treatment agent, or a pigment dispersant, each comprising the sulfonic acid (salt) polymer, wherein the sulfonic acid (salt) polymer comprises 1 to 90% by weight of the monomer unit derived from the monomer represented by the above formula (1) based on the total monomer units.

Preferred examples of the above-mentioned carboxylic acid (salt) monomer are the same those mentioned in the above-mentioned carboxylic acid (salt) polymer having the monomer unit derived from the polyalkylene glycol monomer. Preferred examples of the above-mentioned sulfonic acid (salt) monomer are the same those mentioned in the above-mentioned sulfonic acid (salt) polymer having the monomer unit derived from the polyalkylene glycol monomer.

In the above formula (1), $R^1$ is an alkenyl group containing 2 to 5 carbon atoms. Examples of such an alkenyl group include vinyl group, allyl group, methallyl group, 3-butenyl group, 4-pentenyl group, 3-methyl-3-butenyl group, 3-methyl-2-butenyl group, and 2-methyl-3-butenyl group.

More preferred are vinyl group, allyl group, methallyl group, and 3-methyl-3-butenyl group. Still more preferred are vinyl group, allyl group, and 3-methyl-3-butenyl group.

The group derived from an alkylene oxide containing 2 to 20 carbon atoms and/or glycidyl ether containing 2 to 20 carbon atoms in the above-mentioned AO is the same as that mentioned above. The repeating unit "n" in the AO is the same as the number of the repeating unit in the above-mentioned alkylene oxide. Preferable and more preferable ranges thereof are the same as those mentioned above.

If the above-mentioned AO has groups derived from both of the alkylene oxide and the glycidyl ether, it is preferable that the group derived from the alkylene oxide is 70 to 99 mol % and the group derived from the glycidyl ether is 1 to 30 mol %. It is also preferable that the position of the group derived from the glycidyl ether is distributed near $R^2$.

One or two or more species of the hydrophobic group mentioned in the above-mentioned polyalkylene glycol monomer is/are preferable as the organic group containing 1 to 20 carbon atoms in the above-mentioned $R^2$.

Preferred examples of the hydrocarbon group containing 1 to 20 carbon atoms include alkyl groups such as butyl group, 2-ethylhexyl group, octyl group, nonyl group, dodecyl group, and octadecyl group; aryl groups such as phenyl group, naphthyl group, and anthryl group; alkylaryl groups such as nonylphenyl group and dodecyl phenyl group; and polycyclic alkyl groups such as cyclooctyl group, cholestanyl group, and lanostanyl group. One or two or more species of them may be used. That is, it is preferable that the hydrocarbon group containing 1 to 20 carbon atoms is an alkyl group, an aryl group, an alkyl aryl group, or a polycyclic alkyl group, each containing 1 to 20 carbon atoms. Among them, more preferred are butyl group, 2-ethylhexyl group, phenyl group, and phthalic acid ester group, and more preferred are butyl group and phenyl group.

As the monomers represented by the above formula (1), preferred are the above-mentioned polyalkylene glycol monomers such as the monomers represented by the above formulae (2) to (4) and a monomer represented by the following formula (5) in which a terminal of the polyalkylene glycol chain is modified with an acid anhydride of phthalic anhydride.

sition ratio, and detergency, because the polymer has the monomer unit derived from the monomer represented by the above formula (1).

Hereinafter, one preferable example of production methods of the above-mentioned anionic group-containing monomer is described. The production method of the polycarboxylic acid (salt) polymer is mentioned, but such a production method can apply to production of the anionic group-containing polymer. It is preferable that the carboxylic acid (salt) polymer is prepared by polymerizing the above-mentioned monomer in a solvent. The reaction system in the above-mentioned polymerization reaction may contain an initiator, and other additives.

Aqueous solvents such as water, alcohols, glycol, glycerin, polyethylene glycols are preferable as the above-mentioned solvent. Water is particularly preferable. These may be singly or in combination of two or more species of them. An organic solvent may be appropriately added as long as it adversely affects the polymerization of each monomer, in order to improve solubility of the above-mentioned monomer to the solvent.

Specific examples of the above-mentioned organic solvent include lower alcohols such as methanol and ethanol; amides such as dimethyl formaldehyde; and ethers such as diethyl ether and dioxane. One or two or more species of them may be appropriately selected and used.

The use amount of the above-mentioned solvent is preferably 40 to 300% by weight, 45 to 200% by weight, and more preferably 50 to 150% by weight. If the use amount of the

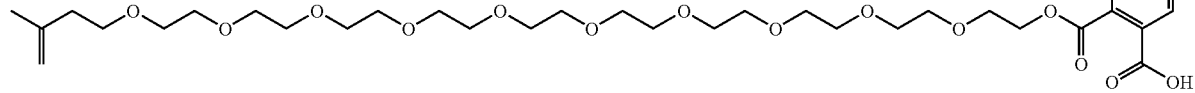

(5)

The above-mentioned polyalkylene glycol monomer is more preferable and the monomers represented by the above formula (2) to (5) are still more preferable.

Particularly preferable as the above-mentioned monomer represented by the formula (1) are monomers in which the organic group in the above formula (1) is a butyl group, a 2-ethyl hexyl group, a phenyl group, and phthalic acid. Monomers in which the organic group in the above formula (1) is a butyl group, a phenyl group, and phthalic acid are more preferable.

The above-mentioned monomer (B) is a monomer copolymerizable with the anionic group-containing monomer and/or the monomer represented by the above formula (1). Preferred examples of the monomer (B) include the monomer (A) mentioned in the above-mentioned polyalkylene glycol monomer, vinyl pyrrolidone, butyl acrylate, styrene, methacrylic acid 2-hydroxyethyl, 3-allyloxy-1,2-propanediol, α-hydroxymethyl methyl acrylate, 2-acrylamide-2-methylpropane sulfonate, and sodium 2-hydroxy-3-allyloxy propane sulfonate. More preferred are butyl acrylate, styrene, and sodium 2-hydroxy 3-allyloxy propane sulfonate.

The above-mentioned anionic group-containing monomer can be preferably used in a detergent builder composition, a water-treatment agent, or a pigment dispersant. The above-mentioned anionic group-containing monomer exhibits excellent performances such as dispersant, anti-soil redeposolvent is less than 40% by weight, the produced carboxylic acid (salt) polymer may have a higher molecular weight. If the use amount of the solvent is more than 300% by weight, the concentration of the produced carboxylic acid (salt) polymer becomes lower and therefore, in some cases, the solvent needs to be removed. Much or all of the solvent may be charged into a reaction container in early stages of the polymerization. Part of the solvent may be singly added (dropwise) into the reaction system appropriately during the polymerization. The monomer component, the initiator component and other additives are previously dissolved in the solvent, and then the solvent may appropriately added (dropwise) in the reaction system during polymerization, together with these components.

Preferred examples of the above-mentioned initiator include hydrogen peroxide; persulfates such as sodium persulfate, potassium persulfate, and ammonium persulfate; bisulfites such as sodium bisulfite, potassium bisulfite, and ammonium bisulfite; sulfites, pyrosulfites, phosphites and phosphinates. One or two or more species of them may be preferably used. Preferred as the initiator are combinations of the above-mentioned persulfates and hydrogen peroxide and combinations of the persulfates and the bisulfites. More preferred are combinations of the persulfates and the bisulfites.

If both of the above-mentioned persulfate and the bisulfite is added as the initiator, the addition ratio is not especially limited as long as functional effects of the present invention are exhibited. The addition ratio can be appropriately determined according to use applications or use environment. The ratio of the persulfate to the bisulfite is preferably 1:0.1 to 10, at a ratio by weight, for example. If the ratio of the bisulfite is less than 0.1, effects of the bisulfite may be insufficient. If the ratio of the bisulfite is less than 0.1 relative to the persulfate 1, the obtained carboxylic acid (salt) polymer tends to have a higher weight average molecular weight. If the ratio of the bisulfite is more than 10 relative to the persulfate 1, effects attributed to the bisulfite may not be obtained for the addition ratio. The ratio of the bisulfite is more preferably 0.5 to 5, and still more preferably 1 to 3.

The addition amount of the above-mentioned persulfate and the bisulfite is preferably 0.1 to 20 g, relative to 1 mol of the carboxylic acid (salt) monomer to be used. If the persulfate and the bisulfite are added within such a range, the obtained polycarboxylic acid (salt) copolymer easily have a weight average molecular weight within a preferable range. The addition amount thereof is more preferably 0.5 to 15 g, and still more preferably 1 to 10 g. If the mixed amount of the persulfate and the bisulfite is too large, the production amount of impurities derived from these compounds is increased. Sulfurous acid gas generated by decomposition of the bisulfite mixed as the initiator adversely affects safety of workers or ambient environment at the polymerization reaction. Therefore, it is preferable that the mixed amount of the persulfate and the bisulfite is smaller.

In the above-mentioned production method, other initiators (including a chain transfer agent) may be used in combination.

Examples of the above-mentioned other initiators (including a chain transfer agent) include azo compounds such as 2,2'-azobis(2-amidinopropane) hydrochloride, 4,4'-azobis-4-cyanovaleric acid, azobisisobutyronitrile, and 2,2'-azobis(4-methoxy-2,4-dimethylvaleronitrile); organic peroxides such as benzoyl peroxide, lauroyl peroxide, peracetic acid, di-t-butyl peroxide, and cumene hydroperoxide; and hydrogen peroxide.

Appropriate additives may be added at a proper amount unless the functional effects of the present invention are sacrificed, as other additives other than the initiator which can be used in the polymerization reaction system when the above-mentioned monomers are polymerized in the aqueous solution. For example, heavy metal ions, heavy metal concentration adjusters, organic peroxides, $H_2O_2$ and metal salts, and the like, may be used.

Examples of heavy metals constituting the above-mentioned heavy metal ions include iron, cobalt, manganese, chromium, molybdenum, tungsten, copper, silver, gold, lead, platinum, iridium, osmium, palladium, rhodium, ruthenium, and salts thereof. One or two or more species of them may be used. Preferably, the polymerization reaction solution contains iron ion. The ion value of the heavy metal ion is not especially limited. If iron is used as the heavy metal ion, for example, iron ion dissolving in the polymerization reaction solution may be $Fe^{2+}$ or $Fe^{3+}$. These Fe2+ and Fe3+ may be combined. As mentioned above, the polymer solution contains such heavy metal ions and thereby the use amount of the persulfate and the bisulfite can be reduced.

A solution prepared by dissolving a heavy metal compound in a solvent may be added as the above-mentioned heavy metal ion. Such a heavy metal compound is determined according to a heavy metal ion which needs to be contained in the polymerization reaction solution. Water-soluble heavy metal salts are preferable if water is used as the solvent. Examples of such water-soluble heavy metal salts include Mohr's salt ($Fe(NH_4)_2(SO_4)_2 \cdot 6H_2O$), ferrous sulfate heptahydrate, ferrous chloride, ferric chloride, and manganese chloride. The heavy metal ion is added by initial addition or successive addition, and preferably added by initial addition. However, the addition method of the heavy metal ion is not limited thereto. The initial addition means a method of previously adding all of the heavy metal ions into the polymerization reaction solution. The successive addition means a method of gradually adding the heavy metal ions with proceeding of the polymerization reaction.

The content of the above-mentioned heavy metal ion is not especially limited, and preferably 0.1 to 20 ppm, and more preferably 0.2 to 10 ppm, and still more preferably 0.3 to 7 ppm, and particularly preferably 0.4 to 6 ppm, and most preferably 0.5 to 5 ppm, relative to the total weight of the polymerization reaction solution upon completion of the polymerization reaction. The addition amount of the heavy metal ion is within the above-mentioned range, and therefore impurities derived from the heavy metal ions are hardly generated.

The above-mentioned "upon the completion of the polymerization reaction" means the time when the polymerization reaction in the polymerization reaction solution has been substantially completed. If the polymerization reaction proceeds in the polymerization reaction solution and the polymerized polymer is neutralized with an alkali component and then the solvent is removed to obtain a solid polymer, for example, the content of the heavy metal ion is calculated based on the total weight of the polymerization reaction solution after neutralized. If two or more species of the heavy metal ions are contained, the total amount of the heavy metal ions is within the above-mentioned range. If the content of the heavy metal ion is less than 0.1 ppm, effects attributed to the heavy metal ion may be insufficiently exhibited. If the content of the heavy metal ion is more than 20 ppm, the color tone may get worse. If the carboxylic acid (salt) polymer is used as a detergent builder or a scale inhibitor, increase in soil or scale may be caused.

The above-mentioned heavy metal concentration adjustor is not especially limited. Polyvalent metal compounds or polyvalent metal simple substances may be used as such an adjustor. Specific examples thereof include aqueous polyvalent metal salts such as vanadium oxytrichloride, vanadium trichloride, vanadyl oxalate, vanadyl sulfate, vanadic acid anhydride, ammonium metavanadate, hypovanadous ammonium sulfate [$(NH_4)_2SO_4 \cdot VSO_4 \cdot 6H_2O$], vanadous ammonium sulfate [$(NH_4)V(SO_4)_2 \cdot 12 H_2O$], copper (II) acetate, copper (II), copper (II) bromide, copper (II)acetyl acetate, ammonium copper(II) chloride, ammonium copper chloride, copper carbonate, copper (II) chloride, copper (II) citrate, copper (II) formate, copper (II) hydroxide, copper nitrate, copper naphthenate, copper (II) oleate, copper maleate, copper phosphate, copper (II) sulfate, cuprous chloride, copper (I) cyanide, copper iodide, copper (I) oxide, copper thiocyanate, iron acetylacenate, ferric ammonium citrate, ferric ammonium oxalate, ferrous ammonium sulfate, ferric ammonium sulfate, iron citrate, iron fumarate, iron maleate, ferrous lactate, ferric nitrate, iron pentacarbonyl, ferric phosphate, and ferric pyrophosphate; polyvalent metal oxides such as vanadium pentoxide, copper (II) oxide, ferrous oxide, and ferric oxide; polyvalent metal sulfides such as iron (III) sulfide, iron (II) sulfide, and copper sulfide; copper powders and iron powders.

The polymerization method of the above-mentioned carboxylic acid (salt) polymer is not especially limited in the production method. One preferable embodiment is a method of adding dropwise the above-mentioned monomers, the initiator and the like, into the aqueous solution into which the heavy metal ions are previously added. A solution containing the above-mentioned monomers and a solution containing the initiator are added dropwise, and thereby each of the components is reacted with each other in the polymerization reaction solution. The concentration of each of the solutions is not especially limited.

The drop time of the above-mentioned each component is generally 60 minutes to 420 minutes, and preferably 90 minutes to 360 minutes. Part of or all of the above-mentioned monomers may be previously charged into the reaction system. The drop time may be different depending on the components. If the drop time is 60 minutes or less, effects attributed to the persulfate and the bisulfite added as the initiator may decrease. In contrast, the drop time of more than 420 minutes has a problem in terms of productivity of the carboxylic acid (salt) polymer. However, the drop time may be out of the above-mentioned range according to the situation.

The drop rate of the above-mentioned each component is not especially limited. Each of the components may be added dropwise at a constant rate from beginning to end, and if necessary, the drop rate may be varied. In order to enhance production efficiency of the polymer, it is preferable that each of the components is added such that the polymerization reaction solution after completion of the addition has a solids concentration, that is, a concentration of solids produced by polymerization of the monomers, of 40% by weight or more.

The polymerization temperature in the above-mentioned polymerization of the monomers is appropriately determined depending on the initiator. The polymerization temperature is most preferably a boiling point if the hydrogen peroxide is used as the initiator. If the bisulfite is used as the initiator, the polymerization temperature is preferably 25 to 99° C. and more preferably 50 to 95° C., and still more preferably 70° C. or more and less than 90° C. If the polymerization temperature is too low, the weight average molecular weight of the obtained polymer and the production amount of impurities may increase. If the polymerization temperature is too high, the amount of sulfurous acid gas generated by decomposition of the bisulfite may increase. The polymerization temperature means a temperature of the polymerization reaction solution. The method of measuring or controlling the polymerization temperature is not especially limited. A commonly used device is used for the measurement.

In the above-mentioned polymerization reaction, the pressure during the polymerization is not especially limited. The polymerization reaction may be performed under normal pressure, reduced pressure, or increased pressure. The atmosphere inside the reaction system may remain air atmosphere, and preferably is inert atmosphere. For example, it is preferable that the inside of the reaction system is substituted with inert gas such as nitrogen before the polymerization. Thereby, atmosphere gas (for example, oxygen gas) inside the reaction system dissolves into the liquid phase and acts as a polymerization inhibitor. As a result, the persulfate as the initiator is prevented from being activated and thereby reducing, and therefore the polymerization can be performed more efficiently.

It is preferable that the polymerization reaction is performed under acid conditions in order to produce the polymer efficiently in the above-mentioned polymerization reaction. Specifically, the neutralization degree of acids in the polymerization reaction solution during the polymerization is preferably less than 40 mol %, and more preferably less than 20 mol %, and still more preferably less than 10 mol %. If the neutralization degree is high, a large amount of impurities may be generated. The lower limit of the neutralization degree is not especially limited. If the neutralization degree is too low, the amount of sulfurous acid gas generated by decomposition of the bisulfite may increase. In view of such circumstances, the neutralization degree of acids in the polymerization reaction solution during the polymerization reaction is preferably kept to 5 mol %.

The reaction solution during the polymerization has a pH of 1 to 6 at 25° C., and more preferably a pH of 1 to 5, and still more preferably 1 to 4, as the above-mentioned acid conditions. If the above-mentioned pH is less than 1, the sulfurous acid gas and corrosion of the device may be generated. If the above-mentioned pH is more than 6, efficiency of the bisulfite decreases and the molecular weight increases.

One or two or more species of the following alkali components may be used in order to adjust pH of the above-mentioned reaction solution during the polymerization. Hydroxides of alkali metals, such as sodium hydroxide and potassium hydroxide; hydroxides of alkaline earth metals, such as calcium hydroxide and magnesium hydroxide; and organic amine salts such as ammonia, monoethanolamine, and triethanolamine. Among them, hydroxides of alkali metals, such as sodium hydroxide and potassium hydroxide, are preferable, and sodium hydroxide is particularly preferable.

In the present invention, the neutralization degree of acids in the polymerization reaction solution during the polymerization reaction means an average neutralization degree of both acids of organic acids and inorganic acids each contained in the polymerization reaction solution. Specific examples of such acid components include monomers having a functional group such as carboxyl group, inorganic acids derived from the initiator such as the persulfate and the bisulfite, and acid compounds generated in the polymerization reaction solution. The inorganic acids derived from the initiator such as the persulfate and the bisulfite, or the acid compounds generally have a neutralization degree of 30 mol % or more. In such a case, the neutralization degree of the acids in the polymerization reaction solution is not below 30 mol % as long as the reaction solution contains alkali components needed for neutralizing 30 mol % or more of the acids contained in the monomers. The measurement method of the neutralization degrees is not especially limited as long as it has certain reproducibility. The neutralization degree of the acids in the polymerization reaction solution can be controlled by adding a proper amount of alkali components or acid components into the polymerization reaction solution. The above-mentioned alkali component such as sodium hydroxide may be added into the solution in order to increase the neutralization degree of the acids in the polymerization reaction solution in which the reaction proceeds under acid conditions.

If the polymerization is performed under acid conditions, the neutralization degree of the obtained carboxylic acid (salt) polymer can be controlled by appropriately adding the above-mentioned alkali component into the solution after completion of the polymerization.

It is preferable that the reaction solution has a solids concentration (that is, solids concentration of the polymerized monomers) of 35% by weight or more upon completion of the drop of the above-mentioned each component and the polymerization reaction in the polymerization reaction system. If the solids concentration is less than 35% by weight, the productivity of the carboxylic acid (salt) polymer may not be considerably improved. The solids concentration is more preferably 40 to 70% by weight, and still more preferably 45 to 65% by weight. As mentioned above, if the solids concentration upon completion of the polymerization reaction is 35% by weight or more, the polymerization can be performed in one step and at a high concentration. Therefore, the carboxylic acid (salt) polymer can be produced efficiently. The concentration step needed in conventional production methods in some cases, can be omitted, for example. Therefore, the productivity of the carboxylic acid (salt) polymer can be significantly improved, which makes it possible to suppress increase in production costs. The above-mentioned "completion of the polymerization reaction" means the time when the drop of all of the drop components has been completed.

The above-mentioned solids concentration can be measured under the following conditions.
"Measurement Method of Solids Concentration"

Nonvolatile matters after 2 hours treatment with a hot air dryer at 110° C. are defined as solids. Then, the solids concentration in the polymerization reaction solution is calculated.

If the solids concentration in the above-mentioned polymerization reaction system is increased in conventional methods, the viscosity of the reaction solution is remarkably increased with proceeding of the polymerization reaction, leading to a problem of significant increase in the weight average molecular weight of the obtained polymer. However, such increase in viscosity of the reaction solution with proceeding of the polymerization reaction can be suppressed if the polymerization reaction is performed on acid side (pH of 1 to 6 at 25° C. and the neutralization degree of 1 to 25 mol %). Therefore, polymers with a low molecular weight can be produced if the polymerization reaction is performed under high concentration conditions, and the production efficiency of the polymer can be significantly increased. Herein used "upon completion of the polymerization reaction" means the time when the drop of all of the drop components has been completed, and preferably means the time when a predetermined maturing time has passed (polymerization has been completed) after completion of the drop of all of the drop components.

The above-mentioned maturing time is generally 1 to 120 minutes, and preferably 5 to 60 minutes and more preferably 10 to 30 minutes. If the maturing time is less than 1 minute, the monomer components may remain because of insufficient maturing, and such residual monomers form impurities, which possibly causes performance reduction and the like. If the maturing time is more than 120 minutes, the polymer solution may be colored. In addition, it is economically inefficient that the polymerization temperature is further applied after completion of the polymerization.

The above-mentioned polymerization temperature is adopted during the above-mentioned maturing, because the maturing is within the above-mentioned polymerization reaction period and therefore is also during the polymerization. Accordingly, the temperature during the maturing may be kept at a certain temperature (preferably at the temperature upon completion of the drop) or may be varied over time. Therefore, the polymerization time means the total time of the above-mentioned drop time and the maturing time, and also means time required from the beginning of the drop to the completion of the maturing.

In the above-mentioned polymerization reaction, existing steel-made or copper based alloy-made reaction containers having an inner wall surface which is treated with glass lining processing and thereby provided with excellent anticorrosiveness, or SUS (stainless)-made containers or stirrers may be used. If the above-mentioned container is used, the above-specified proper amount of the heavy metal ions, particularly iron ions are eluted from the SUS that is a material of the container into the reaction solution. This eluted heavy metal ions bring the same functional effects as in the cases where the above-mentioned heavy metal concentration adjuster is added. Therefore, the reduction of the addition amount of the heavy metal ions or the addition of the heavy metal ions is not needed, which is advantageous in terms of cost effectiveness. A large amount of the heavy metal ions may be eluted if the existing steel or copper based alloy-made reaction container is used. In this case, operations for removing excessive heavy metal ions may be needed because the heavy metal may cause coloring.

The above-mentioned carboxylic acid (salt) polymer may be produced in batch method or in continuous method.

The detergent builder composition of the present invention has the above-mentioned configuration. Such a detergent builder composition is a polyalkylene glycol monomer preferably used as various industrial raw materials and a polyalkylene glycol polymer which can be used in various applications such as cleaning agent compositions, fiber-treatment agents, water-treatment agents, and pigment dispersants in addition to applications such as cement additives and thickeners.

BEST MODE FOR CARRYING OUT THE INVENTION

The present invention is described in more detail below with reference to Examples, but the present invention is not limited to only the following Examples. The terms, "part(s)" and "%" represent "part(s) by weight" and "% by weight", respectively, unless otherwise specified.

(1) Synthetic Example of Monomer

Synthetic Example 1

Into a 1000 mL-separable flask equipped with a thermometer and a stirrer, were charged isoprenol-ethylene oxide 10 mol adduct 526.0 g and powdered potassium hydroxide (hereinafter, abbreviated to KOH) 0.5 g. This mixture was heated to 80° C. and stirred for 1 hour. The KOH was completely dissolved and then, the liquid temperature was lowered to 60° C. Thereinto, phenyl glycidyl ether (hereinafter, abbreviated to PGE) 120.2 g was added over 30 minutes. After completion of the addition of the PGE, reaction was further performed at 60° C. for 120 hours to obtain a monomer (1). Formation of the monomer (1) was identified through decrease of signal derived form the epoxy ring of the PGE in 1H-NMR spectrum. Yield of the monomer (1) calculated based on the result in 1H-NMR spectrum was 95%.

Synthetic Example 2

Into a 1000 mL-separable flask equipped with a thermometer and a stirrer, were charged an isoprenol-ethylene oxide 10 mol adduct 526.0 g and powdered KOH 0.5 g. This mixture was heated to 80° C. and stirred for 1 hour. The KOH was completely dissolved and then the liquid temperature was lowered to 60° C. Thereinto, butyl glycidyl ether (hereinafter, abbreviated to BGE) 104.2 g was added over 30 minutes. After completion of the addition of the BGE, reaction was further performed at 60° C. for 120 hours to obtain a monomer (2). Formation of the monomer (2) was identified through decrease of signal derived from the epoxy ring of the BGE in 1H-NMR spectrum. Yield of the monomer (2) calculated based on the result in 1H-NMR spectrum was 96%.

Synthetic Example 3

Into a 1000 mL-separable flask equipped with a thermometer and a stirrer, were charged an isoprenol-ethylene oxide 10 mol adduct 526.0 g and powdered KOH 0.5 g. This mixture was heated to 80° C. and stirred for 1 hour. The KOH was completely dissolved and then the liquid temperature was lowered to 60° C. Thereinto, 2-ethylhexyl glycidyl ether (hereinafter, abbreviated to EHGE) 148.8 g was added over 30 minutes. After completion of the addition of the EHGE, reaction was further performed at 60° C. for 240 hours to obtain a monomer (3). Formation of the monomer (3) was identified through decrease of signal derived from the epoxy ring of the EHGE in 1H-NMR spectrum. Yield of the monomer (3) calculated based on the result in 1H-NMR spectrum was 90%.

Synthetic Example 4

Into a 1000 mL-separable flask equipped with a thermometer and a stirrer, were charged an isoprenol-ethylene oxide 10 mol adduct 526.0 g. This mixture was heated to 60° C. and thereinto, phthalic anhydride (hereinafter, abbreviated to PAH) 118.5 g was added.

After completion of the addition of the PAH, reaction was further performed at 60° C. for 48 hours to obtain a monomer (4). Formation of the monomer (4) was identified through shift of signal derived from the aromatic ring of the PAH in 1H-NMR spectrum. Yield of the monomer (4) calculated based on the result in 1H-NMR spectrum was 98%.

Synthetic Example 5

Into a 1000 mL-separable flask equipped with a thermometer and a stirrer, was charged an isoprenol-ethylene oxide 10 mol adduct 526.0 g. This mixture was heated to 60° C. and thereinto, trimellitic acid anhydride (hereinafter, abbreviated to TMAH) 153.7 g was added. After completion of the addition of the TMAH, reaction was further performed at 60° C. for 48 hours to obtain a monomer (5). Formation of the monomer (5) was identified through shift of signal derived from the aromatic ring of the TMAH in 1H-NMR spectrum. Yield of the monomer (5) calculated based on the result in 1H-NMR spectrum was 96%.

Synthetic Example 6

Into a 1000 mL-separable flask equipped with a thermometer and a stirrer, were charged SOFTANOL 70 (product of NIPPON SHOKUBAI Co., Ltd.) 491.0 g and powdered KOH 0.5 g. This mixture was heated to 80° C. and stirred for 1 hour. The KOH was completely dissolved and then the liquid temperature was lowered to 60° C. Thereinto, allyl glycidyl ether (hereinafter, abbreviated to AGE) 91.2 g was added over 30 minutes. After completion of the addition of the AGE, reaction was further performed at 60° C. for 240 hours to obtain a monomer (6). Formation of the monomer (6) was identified through decrease of signal derived from the epoxy ring of the AGE in 1H-NMR spectrum. Yield of the monomer (6) calculated based on the result in 1H-NMR spectrum was 80%.

Synthetic Example 7

Into a 1000 mL-separable flask equipped with a thermometer and a stirrer, were charged an isoprenol-ethylene oxide 10 mol adduct 526.0 g and PGE 150.2 g. This mixture was heated to 60° C. under stirring. Thereinto, boron trifluoride diethyl ether complex 3.4 g was added, and reaction was further performed at 60° C. for 24 hours to obtain a monomer (7). Formation of the monomer (7) was identified through decrease of signal derived from the epoxy ring of the PGE in 1H-NMR spectrum. Yield of the monomer (7) calculated based on the result in 1H-NMR spectrum was almost 100%.

Synthetic Example 8

Into a 500 mL-separable flask equipped with a thermometer and a stirrer, were charged an isoprenol-ethylene oxide 50 mol adduct 228.6 g, and PGE 15.0 g. This mixture was heated to 60° C. under stirring. Thereinto, boron trifluoride diethyl ether complex 1.2 g was added, and reaction was further performed at 60° C. for 24 hours to obtain a monomer (8). Formation of the monomer (8) was identified through decrease of signal derived from the epoxy ring of the PGE in 1H-NMR spectrum. Yield of the monomer (8) calculated based on the result in 1H-NMR spectrum was almost 100%.

Synthetic Example 9

Into a 1000 mL-separable flask equipped with a thermometer and a stirrer, were charged an isoprenol-ethylene oxide 10 mol adduct 526.0 g, and BGE 130.2 g. This mixture was heated to 60° C. under stirring. Thereinto, boron trifluoride diethyl ether complex 3.3 g was added, and reaction was further performed at 60° C. for 24 hours to obtain a monomer (9). Formation of the monomer (9) was identified through decrease of signal derived from the epoxy ring of the BGE in 1H-NMR spectrum. Yield of the monomer (9) calculated based on the result in 1H-NMR spectrum was almost 100%.

Synthetic Example 10

Into a 1000 mL-separable flask equipped with a thermometer and a stirrer, were charged an isoprenol-ethylene oxide 10 mol adduct 526.0 g and EHGE 186.2 g. This mixture was heated to 60° C. under stirring. Thereinto, boron trifluoride diethyl ether complex 3.6 g was added, and reaction was further performed at 60° C. for 24 hours to obtain a monomer (10). Formation of the monomer (10) was identified through decrease of signal derived from the epoxy ring of the EHGE in 1H-NMR spectrum. Yield of the monomer (10) calculated based on the result in 1H-NMR spectrum was almost 100%.

Synthetic Example 11

Into a 500 mL-separable flask equipped with a thermometer and a stirrer, were charged an isoprenol-ethylene oxide 50 mol adduct 228.6 g, and C12 to 13 alkyl glycidyl ether (hereinafter, abbreviated to RGE) 25.0 g. This mixture was heated to 60° C. under stirring. Thereinto, boron trifluoride diethyl ether complex 1.3 g was added, and reaction was further performed at 60° C. for 24 hours to obtain a monomer (11). Formation of the monomer (11) was identified through decrease of signal derived from the epoxy ring of the RGE in 1H-NMR spectrum. Yield of the monomer (11) calculated based on the result in 1H-NMR spectrum was almost 100%.

Synthetic Example 12

Into a 500 mL-separable flask equipped with a thermometer and a stirrer, were charged SOFTANOL 200 (product of NIPPON SHOKUBAI Co., Ltd.) 212.8 g and AGE 22.8 g. This mixture was heated to 60° C. under stirring. Thereinto, boron trifluoride diethyl ether complex 1.2 g was added, and reaction was further performed at 60° C. for 24 hours to obtain a monomer (12). Formation of the monomer (12) was identified through decrease of signal derived from the epoxy ring of the AGE in 1H-NMR spectrum. Yield of the monomer (12) calculated based on the result in 1H-NMR spectrum was almost 100%.

Synthetic Example 13

Into a 500 mL-separable flask equipped with a thermometer and a stirrer, were charged SOFTANOL 500 (product of NIPPON SHOKUBAI Co., Ltd.) 238.4 g and AGE 11.4 g. The mixture was heated to 60° C. under stirring. Thereinto, boron trifluoride diethyl ether complex 1.3 g was added, and reaction was further performed at 60° C. for 24 hours to obtain a monomer (13). Formation of the monomer (13) was identified through decrease of signal derived from the epoxy ring of the AGE in 1H-NMR spectrum. Yield of the monomer (13) calculated based on the result in 1H-NMR spectrum was almost 100%.

(2) Synthesis Example of Polymer

Polymerization Example 1

Into a 2.5 L-SUS316 separable flask equipped with a reflux condenser and a stirrer, were charged pure water 344.0 g and Mohr's salt 0.0106 g. This mixture was heated to 90° C. under stirring. Thereinto, the monomer (1) 150.0 g, 80% acrylic acid (hereinafter, abbreviated to 80% AA) 437.5 g, 48% sodium hydroxide (hereinafter, abbreviated to 48% NaOH) 20.3 g, 15% sodium persulfate (hereinafter, abbreviated to 15% NaPS) 101.9 g, 35% sodium hydrogensulfite (hereinafter, abbreviated to 35% SBS) 87.3 g were added dropwise from different drop ports. With respect to the drop time, the monomer (1) was added dropwise over 170 minutes; 80% AA over 180 minutes; 48% NaOH over 180 minutes; 15% NaPS over 185 minutes; and 35% SBS over 175 minutes. The drop of each compound was simultaneously started.

The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 364.8 g thereinto. Thereby, a polymer (1) having a solids concentration of 45% by weight and a final neutralization degree of 95 mol % was produced.

Polymerization Example 2

Into a 2.5 L-SUS316 separable flask equipped with a reflux condenser and a stirrer, were charged pure water 344.0 g and Mohr's salt 0.0106 g. This mixture was heated to 90° C. under stirring. Thereinto, the monomer (2) 150.0 g, 80% AA 437.5 g, 48% NaOH 20.3 g, 15% NaPS 102.1 g, 35% SBS 87.6 g were added dropwise from different drop ports. With respect to the drop time, the monomer (2) was added dropwise over 170 minutes; 80% AA over 180 minutes; 48% NaOH over 180 minutes; 15% NaPS over 185 minutes; and 35% SBS over 175 minutes. The drop of each compound was simultaneously started.

The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 364.8 g thereinto. Thereby, a polymer (2) having a solids concentration of 45% by weight and a final neutralization degree of 95 mol % was produced.

Polymerization Example 3

Into a 2.5 L-SUS316 separable flask equipped with a reflux condenser and a stirrer, were charged pure water 344.0 g and Mohr's salt 0.0106 g. This mixture was heated to 90° C. under stirring. Thereinto, the monomer (4) 150.0 g, 80% AA 437.5 g, 48% NaOH 20.3 g, 15% NaPS 102.1 g, 35% SBS 87.6 g were added dropwise from different drop ports. With respect to the drop time, the monomer (4) was added dropwise over 170 minutes; 80% AA over 180 minutes; 48% NaOH over 180 minutes; 15% NaPS over 185 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 364.8 g thereinto. Thereby, a polymer (3) having a solids concentration of 45% by weight and a final neutralization degree of 95 mol % was produced.

Polymerization Example 4

Into a 2.5 L-SUS316 separable flask equipped with a reflux condenser and a stirrer, were charged pure water 344.0 g and Mohr's salt 0.0106 g. This mixture was heated to 90° C. under stirring. Thereinto, the monomer (3) 150.0 g, 80% AA 437.5 g, 48% NaOH 20.3 g, 15% NaPS 101.7 g, 35% SBS 87.1 g were added dropwise from different drop ports. With respect to the drop time, the monomer (3) was added dropwise over 170 minutes; 80% AA over 180 minutes; 48% NaOH over 180 minutes; 15% NaPS over 185 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 364.8 g thereinto. Thereby, a polymer (4) having a solids concentration of 45% by weight and a final neutralization degree of 95 mol % was produced.

Polymerization Example 5

Pure water 275.0 g was charged into a 2.5 L-SUS316 separable flask equipped with a reflux condenser and a stirrer and heated to 90° C. under stirring. Thereinto, a 80% aqueous solution of isoprenol-ethylene oxide 10 mol adduct 187.5 g, 80% AA 437.5 g, 48% NaOH 20.3 g, 15% NaPS 137.2 g, 35% SBS 117.6 g were added dropwise from different drop ports. With respect to the drop time, the 80% aqueous solution of isoprenol-ethylene oxide 10 mol adduct was added dropwise over 170 minutes; 80% AA over 180 minutes; 48% NaOH over 180 minutes; 15% NaPS over 210 minutes; and 35% SBS over 180 minutes. The drop of each compound was simultaneously started.

The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 364.3 g thereinto. Thereby, a comparative polymer having a solids concentration of 45% by weight and a final neutralization degree of 95 mol % was produced.

Polymerization Example 6

Into a 2.5 L-SUS316 separable flask equipped with a reflux condenser and a stirrer, were charged pure water 328.0 g and Mohr's salt 0.008 g. This mixture was heated to 90° C. under stirring. Thereinto, the monomer (1) 123.4 g, 80% AA 360.0 g, 48% NaOH 16.7 g, 15% NaPS 55.9 g, 35% SBS 35.9 g were added dropwise from different drop ports. With respect to the drop time in the monomer (1) was added dropwise over 170 minutes; 80% AA over 180 minutes; 48% NaOH over 180 minutes; 15% NaPS over 185 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 283.3 g thereinto. Thereby, a copolymer (6) having a solids concentration of 45% by weight, and a final neutralization degree of 90 mol % was produced.

Polymerization Example 7

Into a 2.5 L-SUS316 separable flask equipped with a reflux condenser and a stirrer, were charged pure water 260.0 g and Mohr's salt 0.008 g. This mixture was heated to 90° C. under stirring. Thereinto, the monomer (1) 72.0 g, 80% AA 360.0 g, 48% NaOH 16.7 g, 15% NaPS 54.8 g, 35% SBS 35.2 g were added dropwise from different drop ports. With respect to the drop time, the monomer (1) was added dropwise over 170 minutes; 80% AA over 180 minutes; 48% NaOH over 180 minutes; 15% NaPS over 185 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 283.3 g thereinto. Thereby, a copolymer (7) having a solids concentration of 45% by weight and a final neutralization degree of 90 mol % was produced.

Polymerization Example 8

Into a 2.5 L-SUS316 separable flask equipped with a reflux condenser and a stirrer, were charged pure water 205.0 g and Mohr's salt 0.028 g. This mixture was heated to 90° C. under stirring. Thereinto, a 80% aqueous solution of the monomer (12) 154.3 g, 80% AA 360.0 g, 48% NaOH 16.7 g, 15% NaPS 82.1 g, 35% SBS 70.3 g were added dropwise from different drop ports. With respect to the drop time, the 80% aqueous solution of the monomer (12) was added dropwise over 170 minutes; 80% AA over 180 minutes; 48% NaOH over 180 minutes; 15% NaPS over 190 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 283.3 g and pure water 145.5 g thereinto. Thereby, a copolymer (8) having a solids concentration of 44% by weight and a final neutralization degree of 90 mol % was produced.

Polymerization Example 9

Into a 2.5 L-SUS316 separable flask equipped with a reflux condenser and a stirrer, were charged pure water 360.0 g and Mohr's salt 0.021 g. This mixture was heated to 90° C. under stirring. Thereinto, a 80% aqueous solution of the monomer (8) 200.0 g, 80% AA 200.0 g, 48% NaOH 9.3 g, 15% NaPS 45.8 g, 35% SBS 39.2 g were added dropwise from different drop ports. With respect to the drop time, the 80% aqueous solution of the monomer (8) was added dropwise over 170 minutes; 80% AA over 180 minutes; 48% NaOH over 180 minutes; 15% NaPS over 190 minutes; and 35% SBS over 170 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 157.4 g thereinto. Thereby, a copolymer (9) having a solids concentration of 40% by weight and a final neutralization degree of 90 mol % was produced.

Polymerization Example 10

Into a 2.5 L-SUS316 separable flask equipped with a reflux condenser and a stirrer, were charged pure water 360.0 g and Mohr's salt 0.021 g. This mixture was heated to 90° C. under stirring. Thereinto, a 80% aqueous solution of the monomer (11) 200.0 g, 80% AA 200.0 g, 48% NaOH 9.3 g, 15% NaPS 45.7 g, 35% SBS 39.2 g were added dropwise from different drop ports. With respect to the drop time, the 80% aqueous solution of the monomer (11) was added dropwise over 170 minutes; 80% AA over 180 minutes; 48% NaOH over 180 minutes; 15% NaPS over 190 minutes; and 35% SBS over 170 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 157.4 g thereinto. Thereby, a copolymer (10) having a solids concentration of 40% by weight and a final neutralization degree of 90 mol % was produced.

Polymerization Example 11

Into a 2.5 L-SUS316 separable flask equipped with a reflux condenser and a stirrer, were charged pure water 381.6 g and Mohr's salt 0.020 g. This mixture was heated to 90° C. under stirring. Thereinto, a 80% aqueous solution of the monomer (13) 324.0 g, 80% AA 108.0 g, 48% NaOH 5.0 g, 15% NaPS 34.7 g, 35% SBS 29.8 g were added dropwise from different drop ports. With respect to the drop time, the 80% aqueous solution of the monomer (13) was added dropwise over 170 minutes; 80% AA over 180 minutes; 48% NaOH over 180 minutes; 15% NaPS over 190 minutes; and 35% SBS over 170 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 85.0 g thereinto. Thereby, a copolymer (11) having a solids concentration of 40% by weight and a final neutralization degree of 90 mol % was produced.

Polymerization Example 12

Into a 2.5 L-SUS316 separable flask equipped with a reflux condenser and a stirrer, were charged pure water 163.5 g and Mohr's salt 0.023 g. This mixture was heated to 90° C. under stirring. Thereinto, a 80% aqueous solution of the monomer (13) 135.0 g, 80% AA 270.0 g, 40%2-hydroxy-3-allyloxypropane sulfonic acid (hereinafter, abbreviated to 40% HAPS) 90.0 g, 15% NaPS 64.4 g, 35% SBS 55.2 g were added dropwise from different drop ports. With respect to the drop time, the 80% aqueous solution of the monomer (13) was added dropwise over 150 minutes; 80% AA over 180 minutes; 40% HAPS over 150 minutes; 15% NaPS over 190 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized and diluted by adding 48% NaOH 212.5 g and pure water 121.0 g thereinto. Thereby, a copolymer (12) having a solids concentration of 40% by weight and a final neutralization degree of 85 mol % was produced.

Polymerization Example 13

Into a 2.5 L-SUS316 separable flask equipped with a reflux condenser and a stirrer, were charged pure water 250.0 g and Mohr's salt 0.024 g. This mixture was heated to 90° C. under stirring. Thereinto, a 80% aqueous solution of the monomer (12) 135.0 g, 80% AA 225.0 g, a 40% aqueous solution of 2-acrylamide-2-methylpropane sulfonic acid (hereinafter, abbreviated to 40% AMPS) 225.0 g, 15% NaPS 61.5 g, 35% sodium hypophosphite monohydrate (hereinafter, abbreviated to 35% SHP) 39.5 g were added dropwise from different drop ports. With respect to the drop time, the 80% aqueous solution of the monomer (12) was added dropwise over 170 minutes; 80% AA over 180 minutes; 40% AMPS over 170 minutes; 15% NaPS over 190 minutes; and 35% SHP over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 187.5 g thereinto. Thereby, a copolymer (13) having a solids concentration of 42% by weight and a final neutralization degree of 90 mol % was produced.

Polymerization Example 14

Into a 2.5 L-SUS316 separable flask equipped with a reflux condenser and a stirrer, were charged pure water 228.5 g and Mohr's salt 0.023 g. This mixture was heated to 90° C. under stirring. Thereinto, a 80% aqueous solution of the monomer (13) 250.0 g, 40% AMPS 500.0 g, 15% NaPS 22.1 g, 35% SHP 18.9 g were added dropwise from different drop ports. With respect to the drop time, the 80% aqueous solution of the monomer (13) was added dropwise over 170 minutes; 40% AMPS over 180 minutes; 15% NaPS over 190 minutes; and 35% SHP over 170 minutes. The drop of each compound was simultaneously started. The temperature was maintained at 90° C. until the drop of the 40% AMPS was completed. The same temperature was maintained for 30 minutes after completion of the 40% AMPS addition, thereby the reaction solution was matured. Then, the polymerization was completed. After completion of the polymerization, the reaction solution was cooled and then neutralized by adding 48% NaOH 76.9 g thereinto. Thereby, a copolymer (14) having a solids concentration of 40% by weight and a final neutralization degree of 90 mol % was produced.

Polymerization Example 15

Into a 2.5 L-SUS316 separable flask equipped with a reflux condenser and a stirrer, were charged pure water 330.0 g, maleic anhydride 30.0 g, a 80% aqueous solution of the monomer (11) 399.5 g, and Mohr's salt 0.018 g. This mixture was heated to 90° C. under stirring. Thereinto, 15% NaPS 28.9 g, 35% hydrogen peroxide 24.8 g were added dropwise from different drop ports. With respect to the drop time, the 15% NaPS was added dropwise over 60 minutes and the 35% hydrogen peroxide over 40 minutes. The drop of each compound was simultaneously started. The temperature was maintained at 90° C. until the drop of the 15% NaPS was completed. The same temperature was maintained for 60 minutes after completion of the 15% NaPS addition, thereby the reaction solution was matured. Then, the polymerization was completed. After completion of the polymerization, the reaction solution was cooled and then neutralized by adding 48% NaOH 40.8 g thereinto. Thereby, a copolymer (15) having a solids concentration of 45% by weight and a final neutralization degree of 80 mol % was produced.

Polymerization Example 16

Into a 2.5 L-SUS316 separable flask equipped with a reflux condenser and a stirrer, were charged pure water 330.0 g, maleic anhydride 30.0 g, a 80% aqueous solution of the monomer (13) 399.5 g, and Mohr's salt 0.018 g. This mixture was heated to 90° C. under stirring. Thereinto, 15% NaPS 28.9 g, 35% hydrogen peroxide 24.8 g were added dropwise from different drop ports. With respect to the drop time, the 15% NaPS was added dropwise over 60 minutes and the 35% hydrogen peroxide over 40 minutes. The drop of each compound was simultaneously started. The temperature was maintained at 90° C. until the drop of the 15% NaPS was completed. The same temperature was maintained for 60 minutes after completion of the 15% NaPS addition, thereby the reaction solution was matured. Then, the polymerization was completed. After completion of the polymerization, the reaction solution was cooled and then neutralized by adding 48% NaOH 40.8 g thereinto. Thereby, a copolymer (16) having a solids concentration of 45% by weight and a final neutralization degree of 80 mol % was produced.

Polymerization Example 17

Into a 2.5 L-SUS316 separable flask equipped with a reflux condenser and a stirrer, were charged pure water 215.0 g and Mohr's salt 0.026 g. This mixture was heated to 90° C. under stirring. Thereinto, 80% aqueous solution of the monomer (13) 225.0 g, 80% AA 225.0 g, 48% NaOH 10.4 g, 15% NaPS 34.3 g, 35% SBS 36.7 g were added dropwise from different drop ports. With respect to the drop time, the 80% aqueous solution of the monomer (13) was added dropwise over 170 minutes; 80% AA over 180 minutes; 48% NaOH over 180 minutes; 15% NaPS over 190 minutes; and 35% SBS over 175 minutes. The drop of each compound was simultaneously started. The temperature was maintained at 90° C. until the drop of the 80% AA was completed. The same temperature was maintained for 30 minutes after completion of the 80% AA addition, thereby the reaction solution was matured. Then, the polymerization was completed. After completion of the polymerization, the reaction solution was cooled and then neutralized by adding 48% NaOH 177.1 g and pure water 97.5 g thereinto. Thereby, a copolymer (17) having a solids concentration of 35% by weight and a final neutralization degree of 90 mol % was produced.

Polymerization Example 18

Into a 2.5 L-SUS316 separable flask equipped with a reflux condenser and a stirrer, was charged pure water 197.0 g. The content was heated to 90° C. under stirring. Thereinto, 80% aqueous solution of the monomer (13) 215.5 g, 40% AMPS 431.0 g, 15% NaPS 12.7 g, 35% SHP 13.6 g were added dropwise from different drop ports. With respect to the drop time, the 80% aqueous solution of the monomer (13) was added dropwise over 170 minutes; 40% AMPS over 180 minutes; 15% NaPS over 190 minutes; and 35% SHP over 170 minutes. The drop of each compound was simultaneously started. The temperature was maintained at 90° C. until the drop of the 40% AMPS was completed. The same temperature was maintained for 30 minutes after completion of the 40% AMPS addition, thereby the reaction solution was matured. Then, the polymerization was completed. After completion of the polymerization, the reaction solution was cooled and then neutralized by adding 48% NaOH 66.3 g thereinto. Thereby, a copolymer (18) having a solids concentration of 40% by weight and a final neutralization degree of 90 mol % was produced.

Polymerization Example 19

Into a 2.5 L-SUS316 separable flask equipped with a reflux condenser and a stirrer, was charged pure water 250.0 g. The content was heated to 90° C. under stirring. Thereinto, 80% aqueous solution of the monomer (11) 225.0 g, 40% AMPS 450.0 g, 15% NaPS 13.3 g, 35% SHP 14.2 g were added dropwise from different drop ports. With respect to the drop time, the 80% aqueous solution of the monomer (11) was added dropwise over 170 minutes; 40% AMPS over 180 minutes; 15% NaPS over 190 minutes; and 35% SHP over 170 minutes. The drop of each compound was simultaneously started. The temperature was maintained at 90° C. until the drop of the 40% AMPS was completed. The same temperature was maintained for 30 minutes after completion of the 40% AMPS addition, thereby the reaction solution was matured. Then, the polymerization was completed. After completion of the polymerization, the reaction solution was cooled and then neutralized by adding 48% NaOH 69.2 g thereinto. Thereby, a copolymer (19) having a solids concentration of 40% by weight and a final neutralization degree of 90 mol % was produced.

Polymerization Example 20

Into a 2.5 L-SUS316 separable flask equipped with a reflux condenser and a stirrer, was charged pure water 123.0 g. The content was heated to 90° C. under stirring. Thereinto, 80% aqueous solution of the monomer (11) 161.5 g, 40% AMPS 600.0 g, 15% NaPS 17.1 g, 35% SHP 14.6 g were added dropwise from different drop ports. With respect to the drop time, the 80% aqueous solution of the monomer (11) was added dropwise over 170 minutes; 40% AMPS over 180 minutes; 15% NaPS over 190 minutes; and 35% SHP over 170 minutes. The drop of each compound was simultaneously started. The temperature was maintained at 90° C. until the drop of the 40% AMPS was completed. The same temperature was maintained for 30 minutes after completion of the 40% AMPS addition, thereby the reaction solution was matured. Then, the polymerization was completed. After completion of the polymerization, the reaction solution was cooled and then neutralized by adding 48% NaOH 92.3 g thereinto. Thereby, a copolymer (20) having a solids concentration of 40% by weight and a final neutralization degree of 90 mol % was produced.

"Anti-Soil Redeposition Ability"

(1) White clothes, that is, a cotton cloth and a cotton/polyester mixed cloth used as samples were previously measured for reflectance as white degree. A colorimetric difference meter SE-1200 type (product of Nippon Denshoku Industries Co., Ltd.) and the like can be used for measuring the reflectance.

(2) Pure water was added to calcium chloride dihydrate 2.94 g to prepare hard water 10 kg.

(3) Pure water was added to sodium dodecylbenzenesulfonate 4.0 g, sodium carbonate 6.0 g, sodium sulfate 2.0 g, and AQUALIC YS100 (product of NIPPON SHOKUBAI Co., Ltd.) as sodium polyacrylate 0.40 g to prepare a mixture 80.0 g. The mixture was adjusted to pH 10.0 with hydrochloric acid, and thereto pure water was added. Thereby, a surfactant aqueous solution 100.0 g was prepared.

(4) A targotmeter was set at 27° C. and the hard water 1000 mL and carbon black (obtained from Cleaning Science Association Foundation) 0.25 g were put in a pot and the mixture was stirred at 100 rpm for 1 minute.

(5) A polymer aqueous solution (concentration 0.2%) 5 mL, the surfactant aqueous solution prepared in (3) 5 g, zeolite 0.075 g, the white clothes 5.2 to 5.4 g were put in the pot and the mixture was stirred at 100 rpm for 10 minutes.

(6) The white cloths were wringed by hand, and the hard water 1 L was put in the pot and stirred at 100 rpm for 2 minutes.

(7) The above-mentioned (4) to (6) operations were repeated three times.

(8) The white clothes were pressed with a filler cloth to dry them while smoothing wrinkles. The clothes were measured again for reflectance as whiteness with the colorimetric difference meter.

(9) The anti-soil redeposition ability is determined from the following formula, based on this measurement results. Anti-soil redeposition ability (%)=(whiteness of the white cloth after cleaned)/(whiteness of original white cloth)×100 Table 1 shows the results.

TABLE 1

| | Weight average molecular weight | Clay dispersibility | Anti-soil redeposition ability | Precipitation suppressing ability |
|---|---|---|---|---|
| Polymer (1) | 6000 | 0.40 | 78.6 | 32.5 |
| Polymer (2) | 11000 | 0.43 | 76.7 | 29.0 |
| Polymer (3) | 11000 | 0.39 | 74.8 | 33.7 |
| Polymer (4) | 12000 | 0.44 | 76.5 | 36.9 |
| Polymer (6) | 17000 | 0.44 | 77.7 | 28.9 |
| Polymer (7) | 14000 | 0.40 | 76.8 | 31.1 |
| Polymer (8) | 5000 | 0.42 | 77.4 | 41.2 |
| Polymer (9) | 10000 | 0.43 | 77.6 | 33.9 |
| Polymer (10) | 12000 | 0.44 | 77.8 | 52.1 |
| Polymer (11) | 6000 | 0.46 | 82.1 | 78.1 |
| Polymer (12) | 13000 | 0.44 | 80.0 | 61.2 |
| Polymer (13) | 5000 | 0.42 | 77.4 | 55.2 |
| Polymer (14) | 15000 | 0.47 | 82.0 | 89.8 |
| Polymer (15) | 10000 | 0.40 | 77.0 | 66.3 |
| Polymer (16) | 8000 | 0.42 | 76.8 | 78.6 |
| Polymer (17) | 20000 | 0.45 | 81.6 | 55.5 |
| Polymer (18) | 40000 | 0.46 | 82.0 | 90.5 |
| Polymer (19) | 4000 | 0.43 | 81.1 | 61.4 |
| Polymer (20) | 13000 | 0.40 | 80.1 | 63.8 |
| Comparative Polymer | 10000 | 0.37 | 73.9 | 36.8 |

The polymers having a hydrophobic group have more excellent dispersibility and anti-soil redeposition ability than those of the comparative polymer not having a hydrophobic group at the terminal.

"Clay Dispersibility Under High Hardness Water"

(1) First, ion exchange water was added to glycine 67.56 g and sodium chloride 52.6 g to prepare a mixture 600 g. Then, the mixture was adjusted to pH 8 with a 48% NaOH aqueous solution to prepare a glycine buffer solution.

(2) Calcium chloride dihydrate 0.1634 g, the solution prepared in (1) 60 g, and pure water were mixed to prepare a dispersion solution 1000 g. And a 0.1% polymer aqueous solution on solids equivalent basis was prepared.

(3) Clay of JIS test powder I, Class 11 (Kanto loam, particle: The Association of Powder Process Industry and Engineering, Japan) 0.3 g was added into about 30 cc common test tube used for experiments. Thereinto were added the dispersion solution prepared in (2) 27 g and the 0.1% polymer aqueous solution on solids equivalent basis 3 g. In this case, the calcium concentration in the test solution was 100 ppm on calcium carbonate equivalent basis.

(4) The test tube was sealed with parafilm, and slightly shaken so as to disperse the clay into the whole solution, and further shaken up and down 20 times. This test tube was kept standing on the place not subjected to direct sunlight for 20 hours. Then, supernatant 5 mL was extracted from the dispersion solution with a transfer pipette.

(5) This solution was measured for absorbance (ABS) in a 1 cm cell with UV spectroscope under a wavelength of 380 nm condition. This value was defined as a clay dispersibility value under high hardness water.

"Measurement Method of Precipitation Suppressing Ability"

(1) A calcium chloride aqueous solution was added to water (pH 10) containing sodium dodecylbenzenesulfonate 200 mg/L and a sample polymer 10 mg/L such that the mixture had a hardness of 610 mg/L at a calcium carbonate concentration.

(2) Pure water was added to calcium chloride dihydrate 14.7 g to prepare a mixture 100 g. Thereby, a calcium chloride aqueous solution 1 mol/L was prepared.

(3) Pure water was added to glycine 4.5 g, sodium chloride 3.5 g to prepare a mixture 1000 g. Thereby, a glycine buffer solution was prepared. The solution was adjusted with sodium hydroxide so as to have a pH of 10.

(4) A sample polymer 0.1 g was added to sodium dodecylbenzenesulfonate 2.0 g, and thereto, pure water was added to prepare a mixture 200 g. Thereby, a test solution was prepared.

(5) Pure water was added to the glycine buffer solution prepared in (3) 3.6 g and the test solution prepared in (4) 1.8 g to prepare a mixture 90 g. This mixture was stirred enough with a magnetic stirrer to prepare a sample solution.

(6) The sample solution prepared in (5) was titrated with 1 mol/L calcium chloride with Automatic Titrator produced by Hiranuma Sangyo Corp., (body: COM-550, luminous intensity velocity unit; M-500). Then, the sample aqueous solution was measured for transmittance (wavelength: 650 nm). The titration amount of the calcium chloride aqueous solution was 0.6 mL and the titration rate was 0.025 mL/s.

(7) Based on the measurement results, the sample aqueous solution was measured for transparency at the time of addition of the calcium chloride aqueous solution 0.60 mL. The value was defined as precipitation suppressing ratio. The higher the precipitation suppressing ratio is, the more the precipitation suppressing ability is excellent.

The invention claimed is:

1. A polyalkylene glycol polymer having a monomer unit derived from a polyalkylene glycol monomer and monomer unit derived from a monoethylenically unsaturated carboxylic acid (salt) and/or a monoethylenically unsaturated sulfonic acid (salt) monomer, wherein the polyalkylene glycol polymer is a polyalkylene glycol polymer having a carboxylic acid (salt) group and/or a sulfonic acid (salt) group, and having a weight average molecular weight of 500 to 100,000 and the polyalkylene glycol polymer contains at least 10% by weight of a carboxylic acid (salt) and/or sulfonic acid (salt) monomer unit and 10 to 90% by weight of the polyalkylene glycol monomer unit relative to 100% by weight of the polyalkylene glycol polymer, wherein the carboxylic acid (salt) and/or the sulfonic acid (salt) monomer unit is derived from a monoethylenically unsaturated carboxylic acid (salt)) and/or monoethylenically unsaturated sulfonic acid (salt) and
   wherein the polyalkylene glycol monomer consists of
   1) a polyalkylene glycol backbone,
   2) a polymerizable double bond provided by a residue from isoprenol, allyl alcohol, or methallyl alcohol, wherein said residue is bound to a terminal oxygen of said polyalkylene glycol backbone; and
   3) a residue provided by a glycidyl ether containing 3 to 25 carbon atoms, wherein said residue is bound to a terminal oxygen of said polyalkylene glycol backbone, and said residue contains a hydrocarbon group containing 1 to 20 carbon atoms at the end of said residue, and said hydrocarbon group containing 1 to 20 carbon atoms is at least one member selected from the group consisting of alkyl, aryl, alkylaryl and polycyclic alkyl groups containing 1 to 20 carbon atoms,
   wherein said residue provided by the glycidyl ether containing 3 to 25 carbon atoms has a hydroxyl group and is formed by a reaction between an epoxy group of the glycidyl ether and a hydroxyl group at the terminal of said polyalkylene glycol backbone.

2. The polyalkylene glycol polymer according to claim 1, wherein the polyalkylene glycol polymer has an anti-soil redeposition ability of 75 or more.

3. A detergent builder composition, a water-treatment agent, or a pigment dispersant comprising the polyalkylene glycol polymer according to claim 2.

4. A detergent builder composition, a water-treatment agent, or a pigment dispersant comprising the polyalkylene glycol polymer according to claim 1.

5. The polyalkylene glycol polymer according to claim 1, wherein the polyalkylene glycol polymer having a weight average molecular weight of 1000 to 70,000.

6. The polyalkylene glycol polymer according to claim 5, wherein the polyalkylene glycol polymer having a weight average molecular weight of 1500 to 50,000.

\* \* \* \* \*